United States Patent
Yoon et al.

(10) Patent No.: US 11,733,732 B2
(45) Date of Patent: Aug. 22, 2023

(54) GUIDE APPARATUS FOR SCREEN PROTECTOR INSTALLATION HAVING RECEIVING PLATE

(71) Applicant: SPIGEN KOREA CO., LTD., Seoul (KR)

(72) Inventors: In Sung Yoon, Seoul (KR); Ji Hye Kang, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 17/866,418

(22) Filed: Jul. 15, 2022

(65) Prior Publication Data

US 2023/0024355 A1    Jan. 26, 2023

(30) Foreign Application Priority Data

Jul. 15, 2021    (KR) .................... 10-2021-0092893

(51) Int. Cl.
   *G02B 1/14*    (2015.01)
   *G06F 1/16*    (2006.01)
   *G02B 1/18*    (2015.01)

(52) U.S. Cl.
   CPC ............ *G06F 1/1626* (2013.01); *G02B 1/14* (2015.01); *G06F 1/1613* (2013.01); *G06F 1/1656* (2013.01); *G06F 1/1679* (2013.01); *G02B 1/18* (2015.01); *G06F 2200/1634* (2013.01)

(58) Field of Classification Search
   CPC   G02B 1/14; G02B 1/18; G06F 1/1613; G06F 1/1626; G06F 1/1656; G06F 1/1679; G06F 2200/1634
   See application file for complete search history.

(56) References Cited

FOREIGN PATENT DOCUMENTS

JP    2017130907 A    7/2017
KR    102114849 B1    5/2020

*Primary Examiner* — Ryan S Dunning
(74) *Attorney, Agent, or Firm* — Heedong Chae; Lucem, PC

(57) ABSTRACT

The present invention relates to a guide apparatus for installing a protective film on a front surface of a portable electronic device. The guide apparatus according to one embodiment includes: a receiving plate on which the portable electronic device is placed such that a rear surface of the portable electronic device is in contact with the receiving plate; and a retainer for retaining both end corners of a first side of the portable electronic device such that the retainer is in close contact with the first side of the portable electronic device placed on the receiving plate. The retainer is constructed to have a plurality of retaining lengths on the receiving plate.

13 Claims, 13 Drawing Sheets

GUIDE APPARATUS FOR SCREEN PROTECTOR INSTALLATION HAVING RECEIVING PLATE

TECHNICAL FIELD

The present invention relates to a guide apparatus for screen protector installation, and more specifically, a guide apparatus for installing a protective film on a front surface of a portable electronic device.

BACKGROUND ART

Portable electronic devices, such as mobile phones, smart phones, netbooks, tablet computers, etc., have become popular and widely used as a result of the recent development of the display technologies as well as the information and communication technologies.

Most of these portable electronic devices have a display screen which is a touch-screen, where the touch screen acts as an input device to receive user inputs as well as an output device to display various information in response to user inputs.

Accordingly, the screen is one of the key elements of portable electronic devices together with the main board equipped with the central processing unit (CPU) and memory, and thus, the screen should be well protected from scratches or damage for an extended use of the portable electronic devices.

In order to protect the screen, a screen protector or a protective film (hereinafter collectively referred to as a "protective film"), made of various materials and made in various structures, has been used to be attached to the screen of portable electronic device in order to protect the screen and maintain its original state.

However, such a protective film is very thin and adhesive is uniformly applied to one side of the protective film which is intended to be attached to a screen of a portable electronic device. A release sheet is releasably and temporarily attached to the protective film, and more specifically, attached to the one side of the protective film where adhesive is applied.

Thus, the release sheet should be carefully removed to prevent foreign objects or fingerprints from being attached to or made on the adhesive of the protective film, and the protective film should be well oriented over the screen before being attached thereto. Thus, it is hard for an ordinary user to install a protective film on a screen of a portable electronic device.

This hardship is due to the lack of any means to guide the horizontal and vertical lines so that the horizontal and vertical lines of the film correspond to the horizontal and vertical lines of the screen when attaching the protective film, as the screen of a portable electronic device is installed at the same level, which is not receded nor protruded from the bezel of a portable electronic device.

Thus, it is hard to properly attach the protective film to the screen of the portable electronic device at a time, and it takes a lot of time and efforts to install the protective film due to repeated attachments and detachments of the protective film to and from the screen.

Besides, during the repeated attachments and detachments of the protective film, foreign objects or fingerprints may be attached or left on the protective film, which may lead to appearance of bubbles, and as a result, the attachment of the protective film to the screen may not be aesthetically appealing.

In addition, the shapes and sizes of portable electronic devices vary, depending on their usage and function, and thus, another problem is that different guiding devices are required for each shape and size of portable electronic devices.

Therefore, there exists a need for a guide apparatus which helps easy and convenient installation of a protective film on to a screen of a portable electronic device and can be used for various shapes and sizes of the portable electronic devices.

LIST OF CITED REFERENCES

Patent Literature (Patent Literature 0001) Korean Patent Application Publication No. 10-2013-0041050 (Publication Date of Apr. 24, 2013)

SUMMARY OF THE INVENTION

Technical Problem

The present invention contrives to solve the above-stated disadvantages and problems in installing a protective film to a portable electronic device.

More specifically, the object of the invention is to provide a guide apparatus for more conveniently installing a protective film to a portable electronic device.

Another object of the invention is to provide a single guide apparatus which can be used to install a protective film for various sizes of portable electronic devices.

The present invention is not intended to be limited to any particular technical problem stated above, and other technical problems will become better understood by the following descriptions to those of ordinary skill in the art.

Solution to Problems

In order to obtain the above-mentioned and other advantages, according to one embodiment of the present invention, the present invention provides a guide apparatus, for installing a protective film on a front surface of a portable electronic device, which includes: a receiving plate on which the portable electronic device is placed such that a rear surface of the portable electronic device is in contact with the receiving plate; and a retainer for retaining both end corners of a first side of the portable electronic device such that the retainer is in close contact with the first side of the portable electronic device placed on the receiving plate. The retainer is constructed to have a plurality of retaining lengths on the receiving plate.

In this case, the receiving plate may include: a first coupling hole; a second coupling hole formed at a position spaced apart from the first coupling hole by a first distance (D1); and a third coupling hole formed at a position spaced apart from the first coupling hole by a second distance (D2). The retainer may include: a first retainer formed to correspond to the shape of one end corner of the first side of the portable electronic device and coupled to the first coupling hole; and a second retainer formed to correspond to the shape of the other end corner of the first side of the portable electronic device and coupled to either the second coupling hole or the third coupling hole.

In addition, the receiving plate may include: a first plate, having a first coupling hole and a second coupling hole, formed thereon to be spaced apart from each other by a first distance (D1); and a second plate, having a first coupling hole and a third coupling hole, formed thereon to be spaced apart from each other by a second distance (D2). The retainer may include: a first retainer formed to correspond to the shape of one end corner of the first side of the portable electronic device; and a second retainer formed to correspond to the shape of the other end corner of the first side of the portable electronic device. The first retainer and the second retainer may be coupled to either the first plate or the second plate.

At least one of the first retainer and the second retainer may include: a retaining side constructed to be in close contact with a second side of the portable electronic device where the second side of the portable electronic device is connected to the first side of the portable electronic device; and a top surface constructed to protrude toward the front surface of the portable electronic device from an upper portion of the retaining side.

A step may be formed on the receiving plate at a portion or portions to which the first retainer, or the second retainer, or both are coupled.

The receiving plate may include a first receiving surface and a second receiving surface. The first receiving surface may have a first width (W1) and be formed on one surface of the receiving plate, and the second receiving surface may have a second width (W2) and be formed on the other surface of the receiving plate. The retainer may include a first retaining wall and a second retaining wall such that the first retaining wall is formed along a perimeter of the first receiving surface except for a first direction, and the second retaining wall is formed along a perimeter of the second receiving surface except for the first direction.

The receiving plate may include a first receiving recess and a second receiving recess, such that the first receiving recess has a first width (W1) and is formed on one surface of the receiving plate, and that the second receiving recess has a second width (W2) and is formed on the other surface of the receiving plate. The first receiving recess may be open to a first direction and the second receiving recess may be open to a second direction such that the first direction and the second direction are opposite directions. The retainer may include a first retaining wall of the first receiving recess and a second retaining wall of the second receiving recess. The retainer is constructed to retain both end corners of the first side of the portable electronic device such that the retainer is in close contact with the first side of the portable electronic device.

The first receiving recess and the second receiving recess may be formed not to overlap with each other.

The receiving plate may include a first receiving recess and a second receiving recess, such that the first receiving recess has a first width (W1) and is formed on one surface of the receiving plate, and that the second receiving recess has a second width (W2) and is formed on the first receiving recess. The first receiving recess may be open to a first direction and the second receiving recess may be open to the first direction as well. The retainer may include a first retaining wall of the first receiving recess and a second retaining wall of the second receiving recess, where the retainer is constructed to retain both end corners of the first side of the portable electronic device such that the retainer is in close contact with the first side of the portable electronic device.

The protective film further includes a release sheet attached to an attachment surface of the protective film where the attachment surface of the protective film is constructed to be attached to the front surface of the portable electronic device. The release sheet is divided into a plurality of portions by a dividing line or lines which are parallel to the first side of the portable electronic device.

The present invention is not intended to be limited to any particular technical solutions stated above, and other technical solutions will become fully understood by the following descriptions to those of ordinary skill in the art.

Advantageous Effects of the Invention

The advantages of the guide apparatus for installing a protective film according to the present invention are as follows.

According to at least one embodiment of the present invention, a protective film can be more conveniently attached to a portable electronic device by placing the protective film in close contact with the retainer of the guide apparatus and guiding an attachment location of the protective film such that the retainer retains both end corners of the portable electronic device.

Furthermore, according to at least one embodiment of the present invention, the retainer is constructed to have a plurality of retaining lengths on the receiving plate, and thus, a single guide apparatus can be used for various sizes of portable electronic devices.

Additional advantages will become better understood by the following detailed descriptions. However, this invention is not limited to specific devices or embodiments which are described as way of example only and are not intended to be limiting the claimed invention. It will be appreciated by those of ordinary skill in the art that variations in form, detail, compositions and operation may be made without departing from the spirit and scope of the invention.

DETAILED DESCRIPTION EMBODIMENTS OF THE INVENTION

Reference will now be made in detail to the preferred embodiments of the present invention, examples of which are illustrated in the accompanying drawings, which form a part of this disclosure. However, certain features or functions, which are explained above, may be omitted for concise description of the invention.

Figure 1:
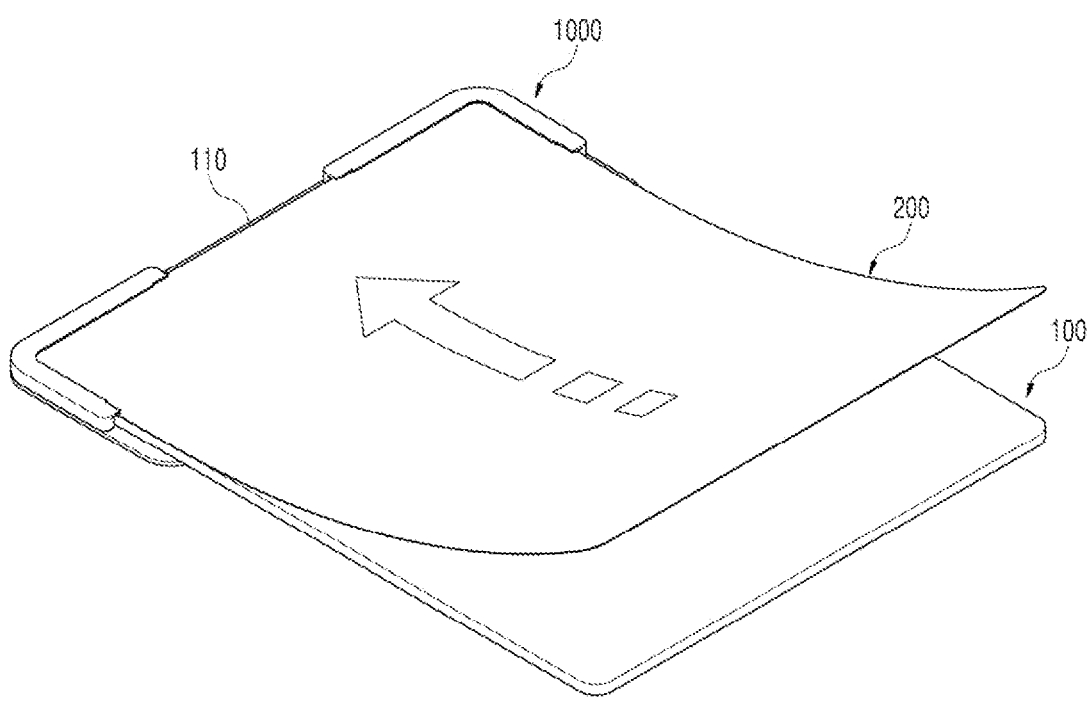
FIG. 1 shows the guide apparatus, for installing a protective film, in use as an example according to the first embodiment of the present invention.
Figure 2:
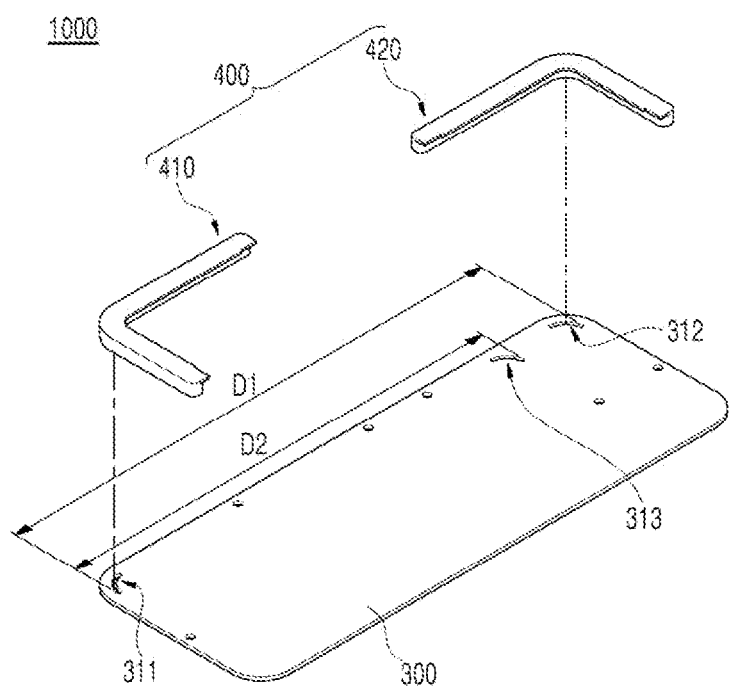
FIGS. 2-4 show the guide apparatus for installing a protective film according to the first embodiment of the present invention.
Figure 3:
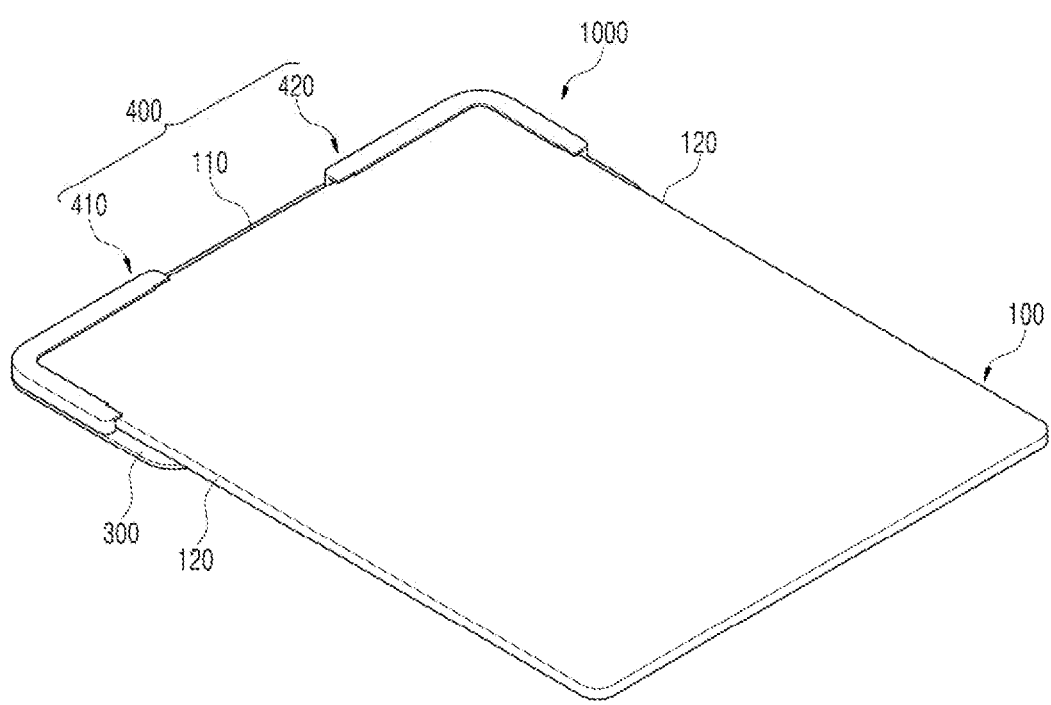
Figure 4:
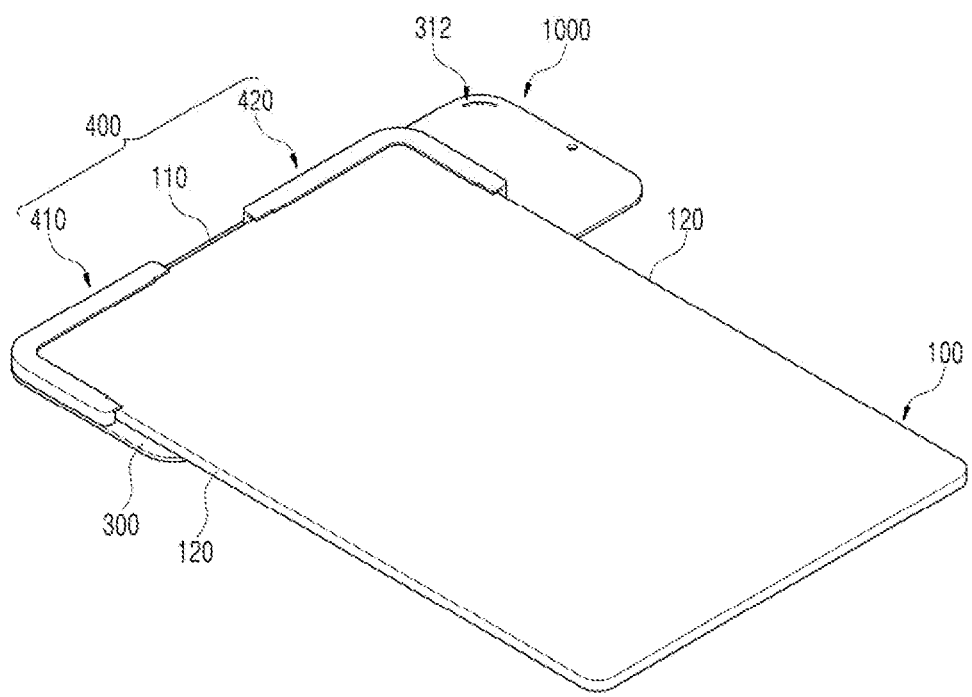

FIG. 1 shows the guide apparatus, for installing a protective film, in use as an example according to the first embodiment of the present invention. FIGS. 2-4 show the guide apparatus for installing a protective film according to the first embodiment of the present invention.

As shown in FIGS. 1-4, the guide apparatus (1000) according to the first embodiment is to install a protective film (200) on a front surface of a portable electronic device (100).

In other words, the guide apparatus (1000) guides the protective film (200) to be installed on a precise location of the front surface of the portable electronic device (100) where a screen is located. Such a portable electronic device (100) includes mobile phones, smart phones, netbooks, tablet computers, etc.

For this purpose, the guide apparatus (1000) according to the first embodiment includes a receiving plate (300) and a retainer (400).

Specifically, the portable electronic device (100) is placed on the receiving plate (300) such that a rear surface of the portable electronic device (100) is in contact with the receiving plate (300). The receiving plate (300) can be a base element of the guide apparatus (1000) for the embodiments of the present invention.

In this case, part of the rear surface of the portable electronic device (100) can be placed on the receiving plate (300) since the receiving plate (300) is formed into a planar element which corresponds to the part of the portable electronic device (100), i.e., the part from the first side (110) of the portable electronic device (100) to a certain distance of the first side (110).

The retainer (400) retains both end corners of the first side (110) of the portable electronic device (100) such that the retainer (400) is in close contact with the first side (110) of the portable electronic device (100) placed on the receiving plate (300). In this case, both end corners mean the parts extended from both ends of the first side (110) to certain distances respectively along the first side (110) and the second side (120) as shown in FIGS. 3 and 4.

In other words, the retainer (400) includes an "L"-shaped part, and it can retain the portable electronic device (100) in the perpendicular "L"-shaped part on both end corners of the first side (110).

Accordingly, as shown in FIG. 1, a user can slide and push the protective film (200) along the front surface of the portable electronic device (100) into the retainer (400) while the portable electronic device (100) is retained by the guide apparatus (1000).

As a result, both end corners of the protective film (200) become in close contact with the retainer (400), and thus, the protective film (200) is placed on a precise location to be attached to the portable electronic device (100).

In the guide apparatus (1000) of the first embodiment, the protective film (200) can be more conveniently attached to the portable electronic device (100) by placing the protective film (200) in close contact with the retainer (400), which retains both end corners of the portable electronic device (100), and guiding an attachment location of the protective film (200).

In particular, the retainer (400) is constructed to have a plurality of retaining lengths on the receiving plate (300).

In this case, retaining length means the distance between the both end corners of the first side (110) of the portable electronic device (100) to be retained by the retainer (400). The longer the retaining length, the larger the portable electronic device (100) for which the guide apparatus (1000) is used.

If the retainer (400) is made only in certain retaining length, different sizes of portable electronic devices (100) require multiple guide apparatuses in different sizes, and this is very inconvenient.

Therefore, it is desirable to allow a single guide apparatus (1000) to be used for various sizes of portable electronic devices (100) by constructing the retainer (400) to have a plurality of retaining lengths on the receiving plate (300).

As such, according to this embodiment of the present invention, the retainer (400) is constructed to have a plurality of retaining lengths on the receiving plate (300), and thus, a single guide apparatus (1000) can be used for various sizes of portable electronic devices (100).

According to the first embodiment of the present invention, the receiving plate (300) includes: a first coupling hole (311); a second coupling hole (312) formed at a position spaced apart from the first coupling hole (311) by a first distance (D1); and a third coupling hole (313) formed at a position spaced apart from the first coupling hole (311) by a second distance (D2).

In this case, the retainer (400) includes a first retainer (410) and a second retainer (420) in that the first retainer (410) is formed to correspond to the shape of one end corner of the first side (110) and coupled to the first coupling hole (311), and that the second retainer (420) is formed to correspond to the shape of the other end corner of the first side (110) and coupled to either the second coupling hole (312) or the third coupling hole (313).

More specifically, the first coupling hole (311), the second coupling hole (312), and the third coupling hole (313) are formed on the receiving plate (300) in the form of a hole, recess, or groove so that the first retainer (410) and the second retainer (420) can be coupled thereto.

In this case, the first retainer (410) may be coupled to the first coupling hole (311), and the second retainer (420) may be coupled to either the second coupling hole (312) or the third coupling hole (313).

Specifically, the second coupling hole (312) may be formed at a position spaced apart from the first coupling hole (311) by the first distance (D1). As shown in FIGS. 2 and 3, the first distance (D1) is greater than the second distance (D2) and corresponds to a larger size of a portable electronic device (100).

Thus, if the second retainer (420) is coupled to the second coupling hole (312) as in FIG. 3, the guide apparatus (1000) can be used for a larger size of a portable electronic device (100).

Furthermore, the third coupling hole (313) may be formed at a position spaced apart from the first coupling hole (311) by the second distance (D2). As shown in FIGS. 2 and 4, the second distance (D2) corresponds to a smaller size of a portable electronic device (100).

Thus, if the second retainer (420) is coupled to the third coupling hole (313) as in FIG. 4, the guide apparatus (1000) can be used for a smaller size of a portable electronic device (100).

As explained, according to the first embodiment of the present invention, the guide apparatus (1000) includes the first coupling hole (311), the second coupling hole (312), the third coupling hole (313), the first retainer (410), and the second retainer (420), and thus, it can be effectively used for different sizes of portable electronic devices (100).

Figure 5:
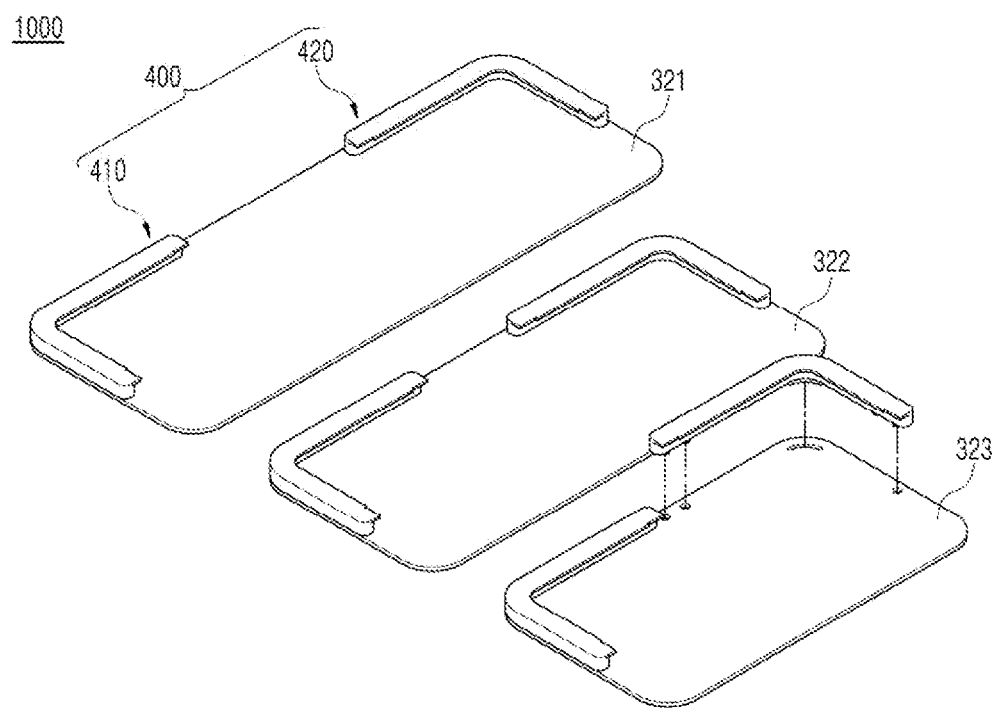
FIG. 5 shows the guide apparatus for installing a protective film according to an alternative example of the first embodiment of the present invention.

FIG. 5 shows the guide apparatus (1000) for installing a protective film (200) according to an alternative example of the first embodiment of the present invention.

The receiving plate (300) includes: a first plate (321) having a first coupling hole (311) and a second coupling hole (312) formed thereon to be spaced apart from each other by a first distance (D1); and a second plate (322) having a first coupling hole (311) and a third coupling hole (313) formed thereon to be spaced apart from each other by a second distance (D2).

The retainer (400) includes: a first retainer (410) formed to correspond to the shape of one end corner of the first side (110) of the portable electronic device (100); and a second retainer (420) formed to correspond to the shape of the other end corner of the first side (110) of the portable electronic device (100). The first retainer (410) and the second retainer (420) may be coupled to either the first plate (321) or the second plate (322).

As shown in FIG. 5, the sizes of the first plate (321) and the second plate (322) may be different. In addition, the receiving plate (300) may further include an additional element of a third plate (323) which is formed in a size different from the first plate (321) or the second plate (322).

In this case, the first coupling hole (311) and the second coupling hole (312) may be formed on the first plate (321) at a position spaced apart from each other by the first distance (D1). The first distance (D1) corresponds to a larger size of a portable electronic device (100).

Thus, if the first retainer (410) and the second retainer (420) are coupled to the first plate (321), the guide apparatus (1000) can be used for a larger size of a portable electronic device (100).

Furthermore, the first coupling hole (311) and the third coupling hole (313) may be formed on the second plate (322) at a position spaced apart from each other by the second distance (D2). The second distance (D2) may correspond to a smaller size of a portable electronic device (100).

Thus, if the first retainer (410) and the second retainer (420) are coupled to the second plate (322), the guide apparatus (1000) can be used for a smaller size of a portable electronic device (100).

As explained, according to the alternative example of the first embodiment, the guide apparatus (1000) includes the first plate (321), the second plate (322), the first retainer (410), and the second retainer (420), and thus, it can be effectively used for different sizes of portable electronic devices (100).

Figure 6:
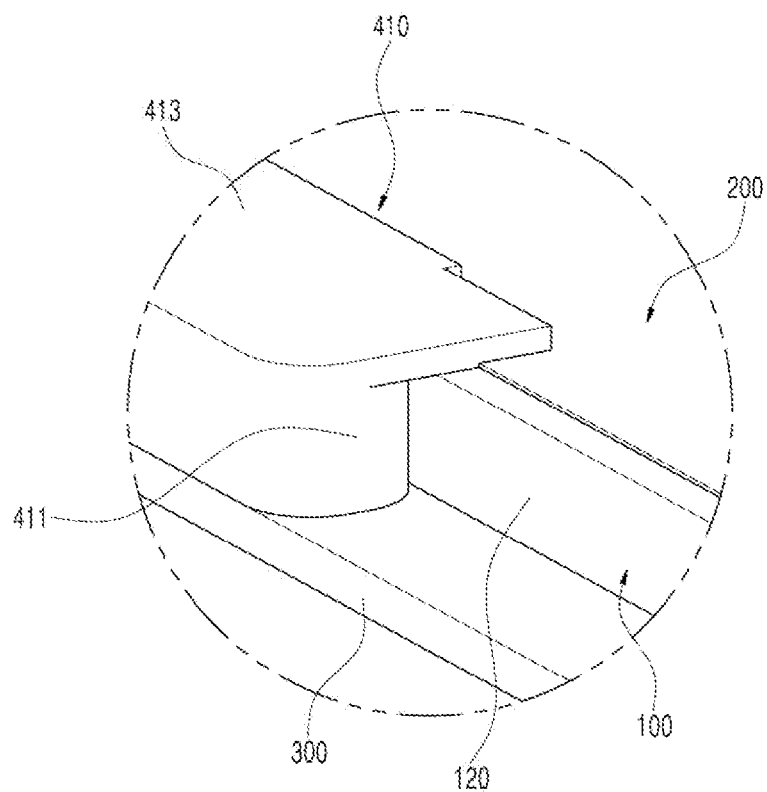
FIG. 6 shows a detailed view of the retainer of the guide apparatus for installing a protective film according to the first embodiment of the present invention.

FIG. 6 shows a detailed view of the retainer (400) of the guide apparatus (1000) according to the first embodiment of the present invention.

In the guide apparatus (1000) of the first embodiment, at least one of the first retainer (410) and the second retainer (420) includes: a retaining side (411) constructed to be in close contact with a second side (120) of the portable electronic device (100) where the second side (120) of the portable electronic device (100) is connected to the first side (110) of the portable electronic device (100); and a top surface (413) constructed to protrude toward the front surface of the portable electronic device (100) from an upper portion of the retaining side (411).

The structure of the first retainer (410) will be explained in detail below referring to FIG. 6. This structure of the first retainer (410) applies to the second retainer (420) as well.

The first retainer (410) is coupled to the receiving plate (300) such that the first retainer (410) protrudes upwardly from the receiving plate (300) and that the retaining side (411) of the first retainer (410) becomes in close contact with a side of the portable electronic device (100). Specifically, the retaining side (411) may be in close contact with the second side (120) of the portable electronic device (100) which is connected to the first side (110) of the portable electronic device (100).

Besides, the top surface (413), which laterally extends from the upper portion of the retaining side (411), partially covers the front surface of the portable electronic device (100) and the protective film (200).

Thus, at least one of the first retainer (410) and the second retainer (420) can have a sliding rail structure where the portable electronic device (100) slides along to be inserted therein.

Since the portable electronic device (100) slides along the sliding rail structure of the first retainer (410) and the second retainer (420) to be inserted therein and placed on the receiving plate (300), the portable electronic device (100) can be more securely and precisely retained.

Specifically, since the portable electronic device (100) is securely and precisely retained, the guide apparatus (1000) prevents the protective film (200) from being disengaged from the portable electronic device (100) or dislodged from the guide apparatus (1000) when installing the protective film (200) on the portable electronic device (100).

In this case, the protective film (200) may be made of hard materials such as tempered glass or the like, or soft materials such as PET (polyethylene terephthalate), TPU (thermoplastic polyurethane), or the like.

Especially when the protective film (200) is made of a soft material, it can be bent easily, and the present invention can be more effective in preventing the protective film (200) from being disengaged or dislodged.

In many cases, a camera lens is located on the rear surface of the portable electronic device (100). Such a camera lens may be located on a top portion of the rear surface toward either side of the rear surface and may be protruded from the rear surface.

Thus, when placing the portable electronic device (100) on the receiving plate (300), such a camera lens protruded from the rear surface may be damaged.

Especially when the portable electronic device (100) is slidably retained in the receiving plate (300) as described above, the camera lens may obstruct sliding and inserting the portable electronic device (100) along the sliding rail structure of the first retainer (410) and the second retainer (420).

Figure 15:
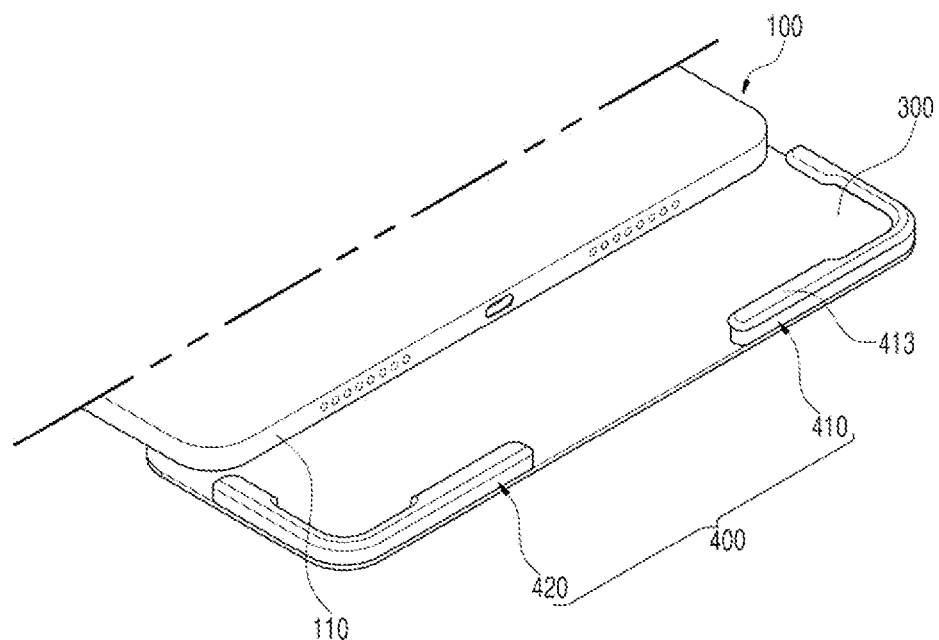
FIGS. 15 and 16 show alternative examples of the retainer in the guide apparatus according to the first embodiment of the present invention.

Thus, as shown in FIG. 15, it is desirable to slide and insert the part of the portable electronic device (100), where the camera lens is not located (if the camera lens is located on a top portion of the rear surface toward either side of the rear surface, the part to be slid and inserted should be the bottom portion of the rear surface), to be retained by the guide apparatus (1000).

After the portable electronic device (100) is slid along the sliding rail structure and retained on the receiving plate (300), the protective film (200) is slid and inserted in between the front surface of the portable electronic device (100) and the top surface (413).

In this case, side edges of the protective film (200) can be precisely secured by close contact with the retaining side (411), but it is hard to tell whether the top edge of the protective film (200) is well aligned with the first side (110) of the portable electronic device (100) because the top edge of the protective film (200) is hidden below the top surface (413).

Figure 16:
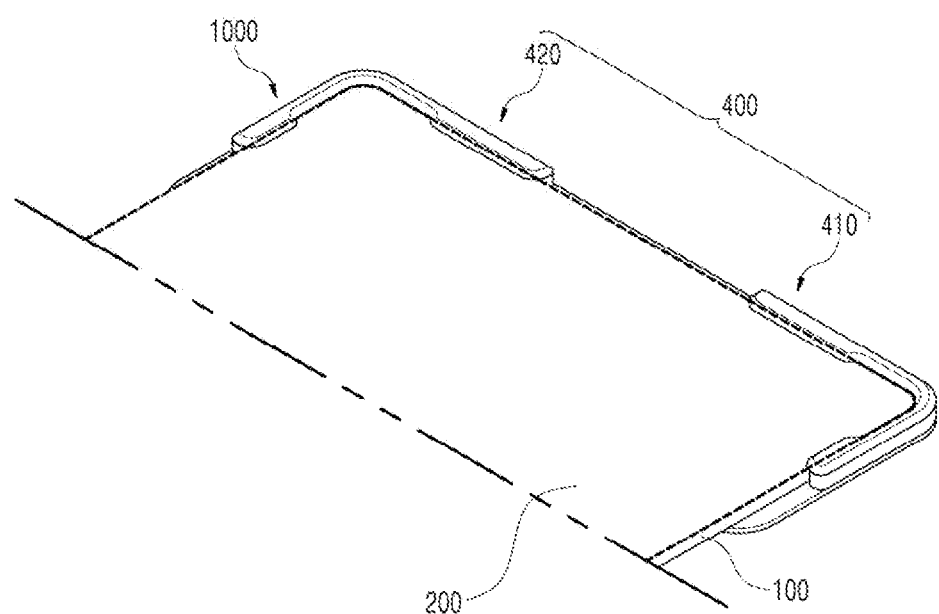

Thus, it is desirable to form the top surface (413) partially open as shown in FIG. 16 such that part of the top surface (413) is narrower and visually open.

FIGS. 15 and 16 only illustrate examples, and the present invention is not limited to such examples. Groove, slot, or through-hole structure may be used to partially open the top surface (413) for a user to visually check whether the top edge of the protective film (200) is well aligned with the first side (110) of the portable electronic device (100).

Figure 7:
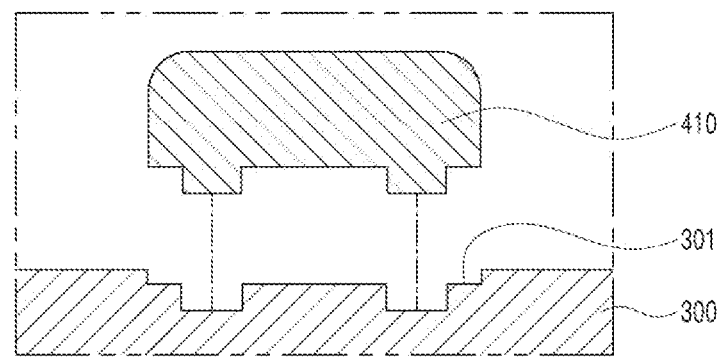
FIG. 7 shows a cross-sectional view illustrating the step of the receiving plate in the guide apparatus for installing a protective film according to the first embodiment of the present invention.

FIG. 7 shows a cross-sectional view illustrating the step (301) of the receiving plate (300) in the guide apparatus (1000) for installing a protective film according to the first embodiment of the present invention.

In the first embodiment of the present invention, a step (301) may be formed on the receiving plate (300) at a portion or portions to which the first retainer (410), or the second retainer (420), or both are coupled.

More specifically, the coupling structure between the receiving plate (300) and the first retainer (410) will be explained in detail below, referring to FIG. 7. This structure of the receiving plate (300) applies to the second retainer (420) as well.

The step (301) is formed on the receiving plate (300) as shown in the cross-sectional view of FIG. 7, and the first retainer (410) is coupled in the step (301).

As described above, the guide apparatus (1000) can be effectively used for different sizes of portable electronic devices (100) by using different coupling locations of the first retainer (410) or the second retainer (420) on the receiving plate (300).

However, different portable electronic devices (100) may have different thicknesses as well as different sizes. If the height of the first retainer (410) on the receiving plate (300) does not correspond to the thickness of a portable electronic device (100), the portable electronic device (100) may not be securely retained.

Thus, using the structure of the step (301), the first retainer' height from the receiving plate (300) can be adjusted.

In other words, when the portable electronic device (100) is relatively thick, the first retainer' height from the receiving plate (300) can be increased by coupling the first retainer (410) to the step (301) where the depth of the step (301) is relatively low out of varying depths of the step (301).

On the other hand, when the portable electronic device (100) is relatively thin, the first retainer' height from the receiving plate (300) can be decreased by coupling the first retainer (410) to the step (301) where the depth of the step (301) is relatively high out of varying depths of the step (301).

Accordingly, the guide apparatus (1000) of the first embodiment can be effectively used for different thicknesses of the portable electronic devices (100) by using the step structure of the receiving plate (300) and adjusting the height of the first retainer (410).

Figure 13:
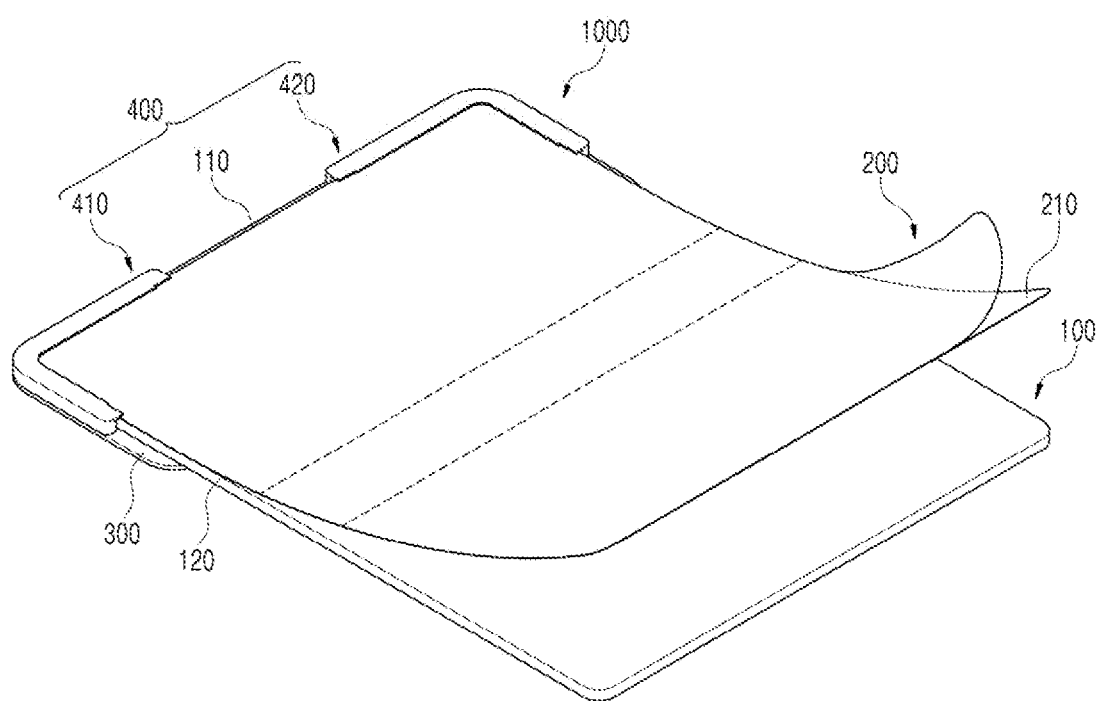
FIG. 13 shows a detailed view of the protective film being installed on the portable electronic device by using the guide apparatus according to the first embodiment of the present invention.
Figure 14:
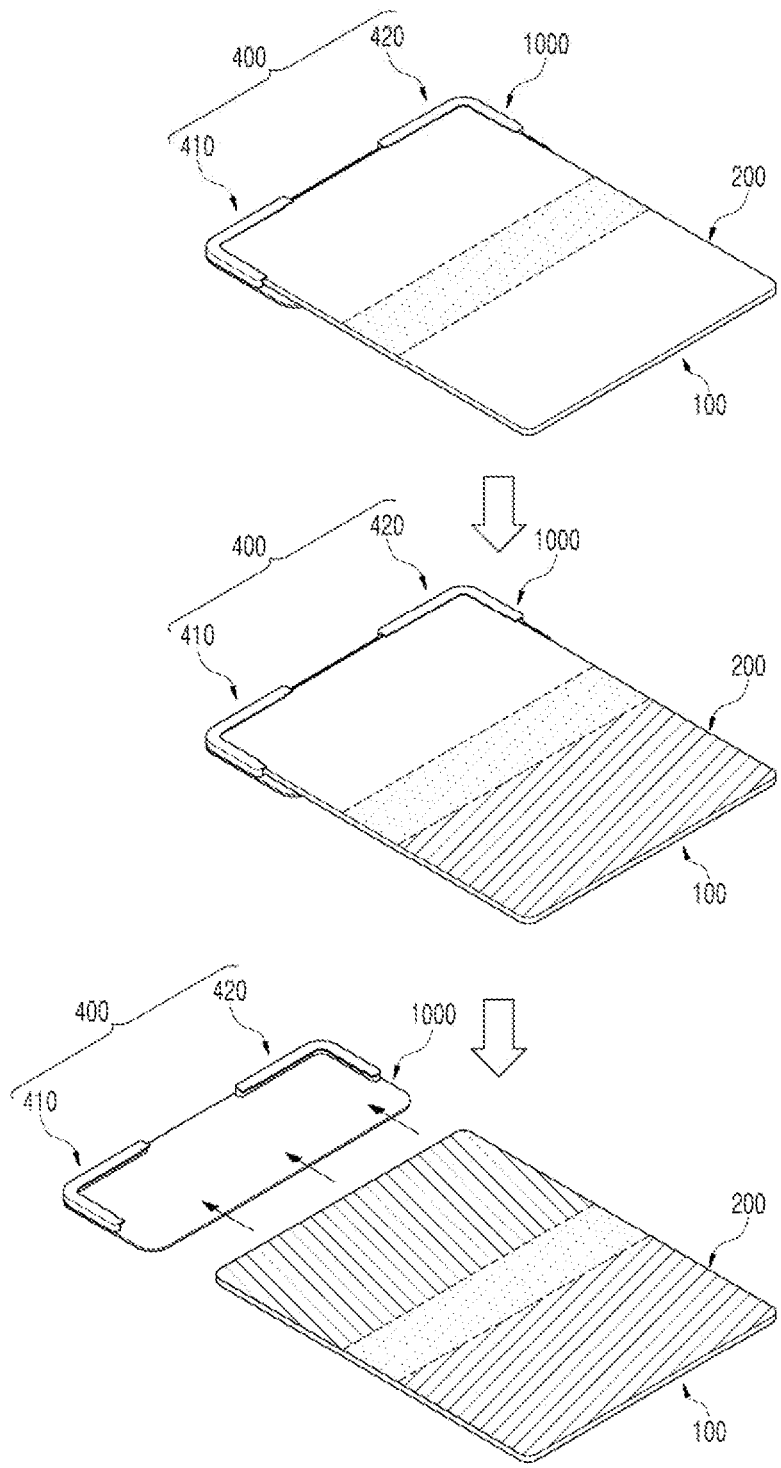
FIG. 14 shows the steps to install the protective film on the portable electronic device by using the guide apparatus according to the first embodiment of the present invention.

FIG. 13 shows a detailed view of the protective film being installed on the portable electronic device by using the guide apparatus according to the first embodiment of the present invention. FIG. 14 shows the steps to install the protective film on the portable electronic device by using the guide apparatus according to the first embodiment of the present invention.

According to the first embodiment of the present invention, the protective film (200) includes a release sheet (210) temporarily attached to an attachment surface of the protective film (200) such that the attachment surface of the protective film (200) is constructed to be attached to the front surface of the portable electronic device (100). The release sheet (210) is divided into a plurality of portions by a dividing line or lines which are parallel to the first side (110) of the portable electronic device (100).

The steps to install the protective film (200) on the front surface of the portable electronic device (100) after removing the release sheet (210) will be explained with an example, referring to FIG. 13.

Generally, adhesive is uniformly applied to the attachment surface of the protective film (200) which is intended to be attached to a portable electronic device (100). A release sheet is temporarily and releasably attached to the adhesive before installation of the protective film (200) in order to protect the adhesive and prevent foreign objects from being attached thereto.

In this case, a user removes the release sheet (210) from the protective film (200), and then, attaches the attachment surface of the protective film (200) to the front surface of the portable electronic device (100).

As explained above, using the guide apparatus (1000) of the present invention, both end corners of the protective film (200) can be securely retained by and in close contact with the retainer (400) and properly aligned to be attached to the portable electronic device (100).

However, after removing the release sheet (210), foreign objects or fingerprints may be attached or left on the protective film (200), and bubbles may appear. It can be especially challenging for a user to properly attach the protective film (200) to the portable electronic device (100) after removing the whole release sheet (210) at a time.

Thus, it may be desirable to divide the release sheet (210) into a plurality of portions so that the user can sequentially remove the portions of the release sheet (210) and attach the protective film (210) to the portable electronic device portion by portion.

For example, as illustrated in FIG. 14, the middle portion of the release sheet (210) is removed first and both end corners of the protective film (200) can be made securely retained in and in close contact with the retainer (400).

Next, the middle portion of the protective film (200) is first attached to the front surface of the portable electronic device (100). In this case, this first attachment can be conveniently accomplished because both end corners of the first side (110) and both end corners of the protective film (200) are securely retained by the retainer (400).

Next, the portion of the release sheet (210), which is opposite to the portion of the release sheet retained by the retainer (400), is removed, and the corresponding portion of the protective film (200) is secondly attached to the front surface of the portable electronic device (100).

In this case, the second attachment can be conveniently accomplished because of the first attachment and secure retention of both end corners of the protective film (200) by the retainer (400).

Last, the portable electronic device (100) and the protective film (200) are removed from the guide apparatus (1000). Then, the remaining portion of the release sheet (210) is removed from the protective film (200) and thirdly attached to the front surface of the portable electronic device (100).

In this case, the third attachment can be conveniently accomplished because of the first and second attachments.

Figure 8:
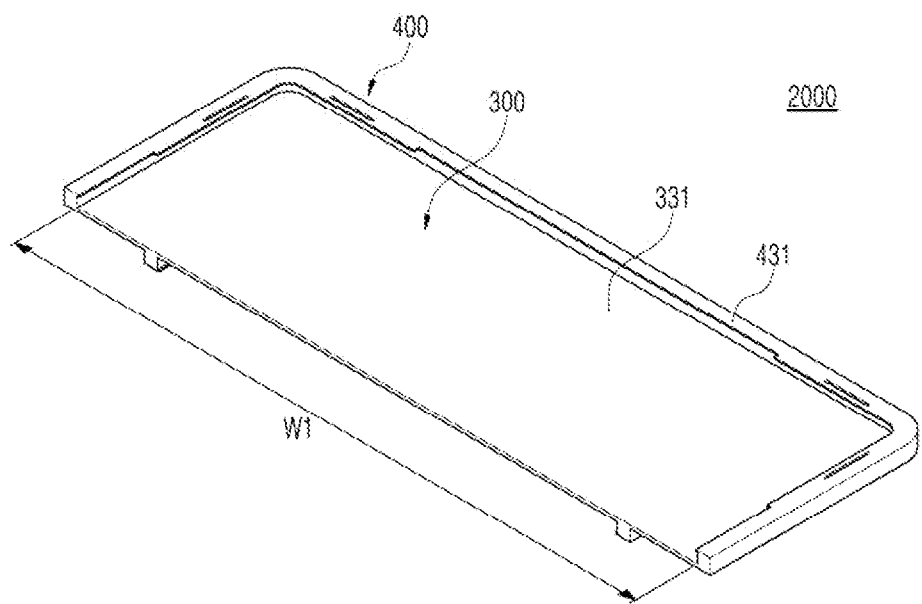
FIGS. 8 and 9 show the guide apparatus for installing a protective film according to the second embodiment of the present invention.
Figure 9:
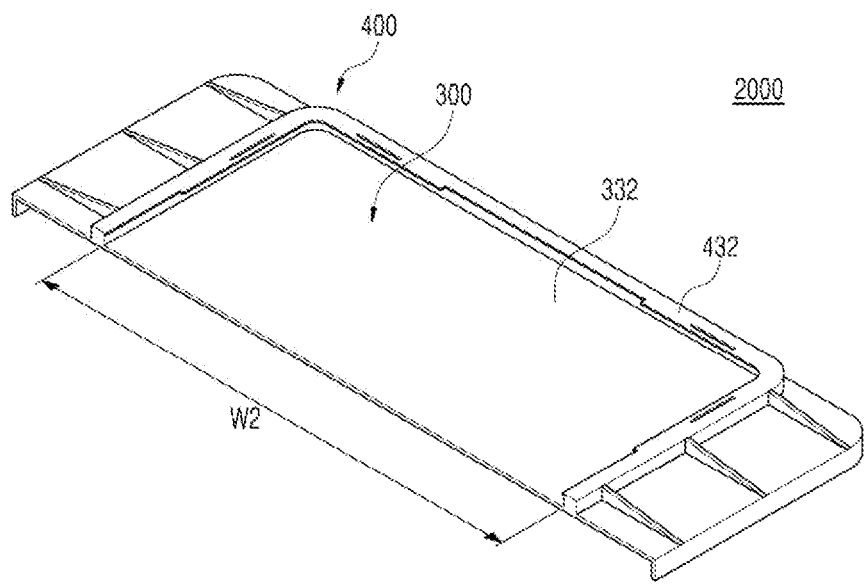

FIGS. 8 and 9 show the guide apparatus for installing a protective film according to the second embodiment of the present invention.

According to the second embodiment, the receiving plate (300) includes a first receiving surface (331) and a second receiving surface (332). The first receiving surface (331) has a first width (W1) and is formed on one surface of the receiving plate (300), and the second receiving surface (332) has a second width (W2) and is formed on the other surface of the receiving plate (300).

In this case, the retainer (400) includes a first retaining wall (431) and a second retaining wall (432). The first retaining wall (431) is formed along a perimeter of the first receiving surface (331) except for a first direction, and the second retaining wall (432) is formed along a perimeter of the second receiving surface (332) except for the first direction.

More specifically, the first and second receiving surfaces (331, 332) are planes formed on the receiving plate (300) where part of the rear surface of the portable electronic device (100) is placed.

In this case, the first receiving surface (331) on the one surface of the receiving plate (300) has the first width (W1), which is greater than the second width (W2). The first width (W1) corresponds to a larger size of a portable electronic device (100).

The first retaining wall (431) is formed along the perimeter of the first receiving surface (331) except for the first direction in order to retain a portable electronic device (100) which is placed on the first receiving surface (331).

Thus, if the first side of the portable electronic device (100) is retained on the one surface of the receiving plate (300), the guide apparatus (2000) can be used for a larger size of a portable electronic device (100).

Furthermore, the second receiving surface (332) on the other surface of the receiving plate (300), which is the opposite surface of the one surface of the receiving plate (300), has the second width (W2). The second width (W2) corresponds to a smaller size of a portable electronic device (100).

The second retaining wall (432) is formed along the perimeter of the second receiving surface (332) except for the first direction in order to retain a portable electronic device (100) which is placed on the second receiving surface (332).

Thus, if the first side of the portable electronic device (100) is retained on the other surface of the receiving plate (300), the guide apparatus (2000) can be used for a smaller size of a portable electronic device (100).

As explained above, according to the second embodiment, the guide apparatus (2000) includes the first and second receiving surfaces (331, 332), and the first and second retaining walls (431, 432), and it can be effectively used for various sizes of portable electronic devices (100).

Except for the explanation above regarding the guide apparatus (2000) of the second embodiment, the second embodiment includes major structures which are identical or similar to those of the first embodiment, and thus, such duplicative structures of the second embodiment are omitted.

Figure 10:
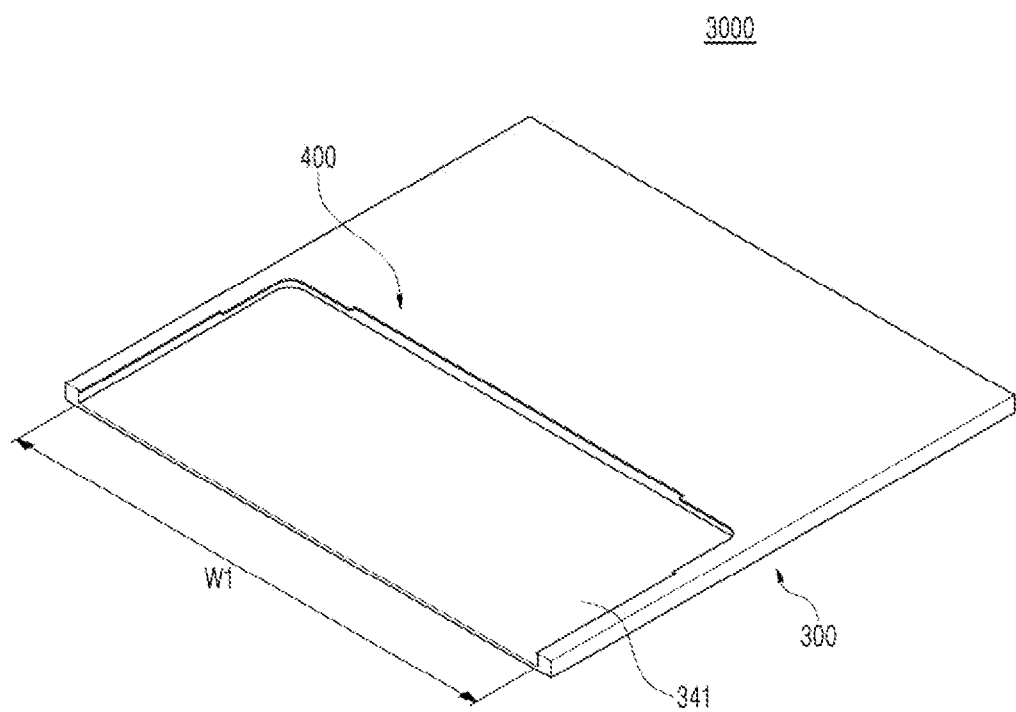
FIGS. 10 and 11 show the guide apparatus for installing a protective film according to the third embodiment of the present invention.
Figure 11:
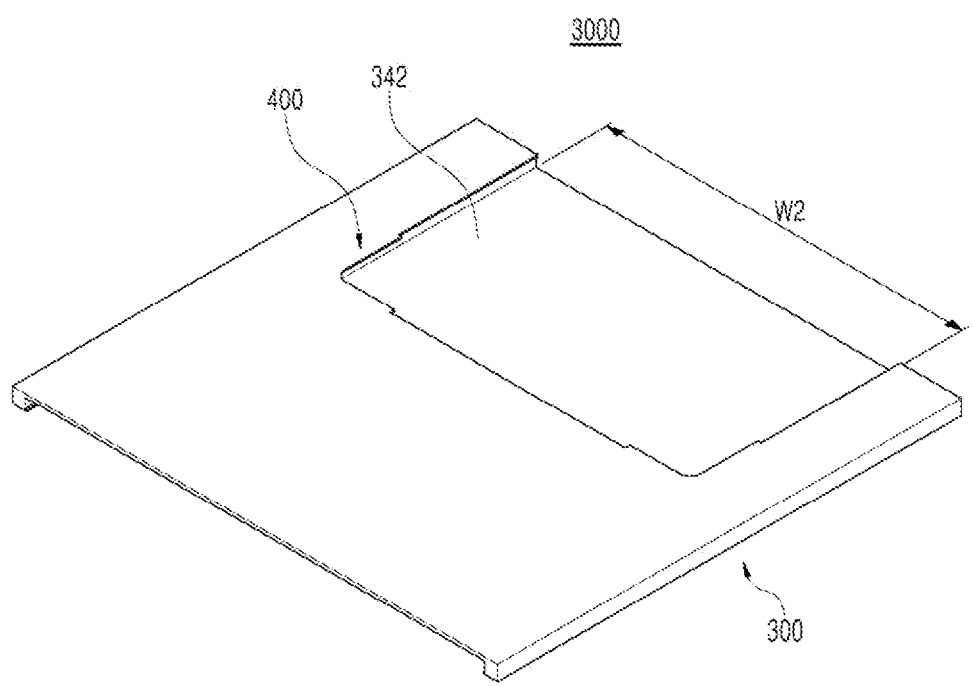

FIGS. 10 and 11 show the guide apparatus for installing a protective film according to the third embodiment of the present invention.

As shown in FIGS. 10 and 11, according to the third embodiment, the receiving plate (300) includes a first receiving recess (341) and a second receiving recess (342). The first receiving recess (341) has a first width (W1) and is formed on one surface of the receiving plate (300), and the second receiving recess (342) has a second width (W2) and is formed on the other surface of the receiving plate (300).

In this case, the retainer (400) includes a first retaining wall of the first receiving recess (341) and a second retaining wall of the second receiving recess (342). The retainer (400) is constructed to retain both end corners of the first side (110) of the portable electronic device (100) such that the retainer (400) is in close contact with the first side (110) of the portable electronic device (100).

More specifically, parts of the receiving plate (300) are respectively recessed to form the first receiving recess (341) and the second receiving recess (342) so that the rear surface of the portable electronic device (100) can be placed thereon.

In this case, the first receiving recess (341) on the one surface of the receiving plate (300) is open to a first direction, having the first width (W1) which is greater than the second width (W2). The first width (W1) corresponds to a larger size of a portable electronic device (100).

When a portable electronic device (100) is placed on the first receiving recess (341), the first retaining wall of the first receiving recess (341) becomes in close contact with the first side (110) of the portable electronic device (100) and retains both end corners of the first side (110) of the portable electronic device (100).

Thus, if the portable electronic device (100) is retained on the one surface of the receiving plate (300) from the first direction, the guide apparatus (3000) can be used for a larger size of a portable electronic device (100).

In addition, the second receiving recess (342) on the other surface of the receiving plate (300), which is the opposite surface of the one surface of the receiving plate (300), is open to a second direction, which is the opposite direction of the first direction. The second receiving recess (342) has the second width (W2), which corresponds to a smaller size of a portable electronic device (100).

When a portable electronic device (100) is placed on the second receiving recess (342), the second retaining wall of the second receiving recess (342) becomes in close contact with the first side (110) of the portable electronic device (100) and retains both end corners of the first side (110) of the portable electronic device (100).

Thus, if the portable electronic device (100) is retained on the other surface of the receiving plate (300) from the second direction, the guide apparatus (3000) can be used for a smaller size of a portable electronic device (100).

As explained above, according to the third embodiment, the guide apparatus (3000) includes the first and second receiving recesses (341, 342), and it can be effectively used for various sizes of portable electronic devices (100).

In the third embodiment, the first receiving recess (341) and the second receiving recess (342) may be formed not to overlap with each other when looked at from a plane defined by the receiving plate (300).

In other words, the first receiving recess (341) may be formed on the receiving plate (300) toward the first direction whereas the second receiving recess (342) may be formed on the receiving plate (300) toward the second direction. The inner most part of the first receiving recess (341) may be formed to be spaced apart from the inner most part of the second receiving recess (342).

If the first receiving recess (341) and the second receiving recess (342) are formed to overlap with each other when looked at from a plane defined by the receiving plate (300), then the receiving plate (300) has to be thick enough to cover the depth of the first receiving recess (341) and the depth of the second receiving recess (342).

Thus, the receiving plate (300) can become unnecessarily thick, and this is not desirable given the hardness of the receiving plate (300).

Accordingly, according to the third embodiment, the first receiving recess (341) and the second receiving recess (342) are formed to be spaced apart on a plane of the receiving plate (300), and then, the thickness of the receiving plate (300) can be minimized and proper hardness of the receiving plate (300) can be secured.

Except for the explanation above regarding the guide apparatus (3000) of the third embodiment, the third embodiment includes major structures which are identical or similar to those of the first and second embodiments (1000, 2000), and thus, such duplicative structures of the first and second embodiments are omitted.

Figure 12:
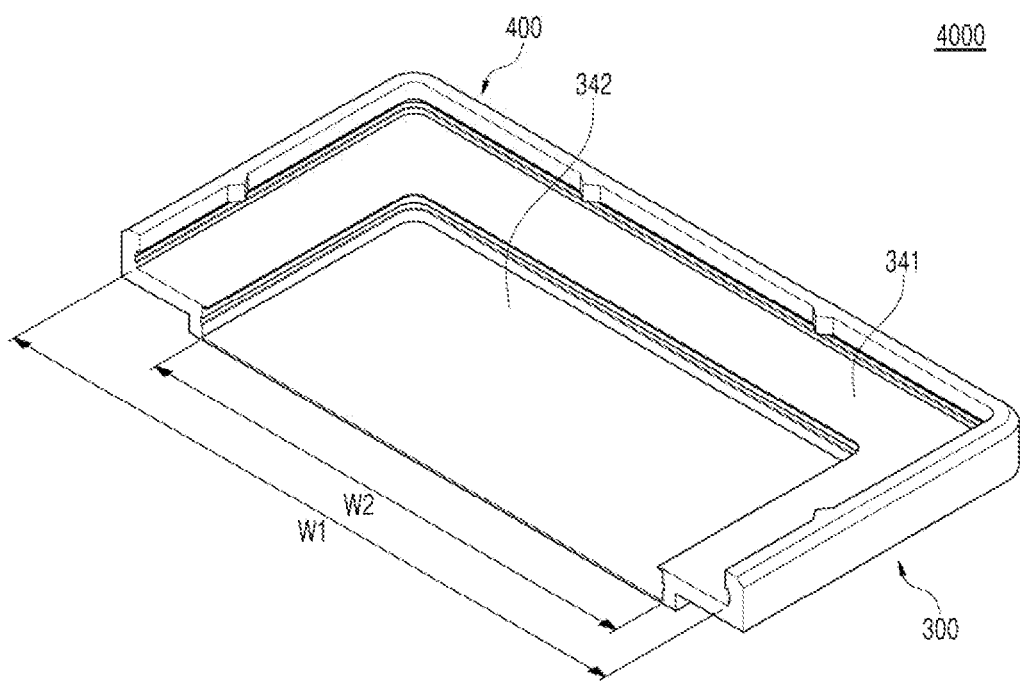
FIG. 12 shows the guide apparatus for installing a protective film according to the fourth embodiment of the present invention.

FIG. 12 shows the guide apparatus for installing a protective film according to the fourth embodiment of the present invention.

As shown in FIG. 12, the receiving plate (300) includes a first receiving recess (341) and a second receiving recess (342), where the first receiving recess (341) has a first width (W1) and is formed on one surface of the receiving plate, and the second receiving recess (342) has a second width (W2) and is formed on the first receiving recess (341).

In this case, the retainer (400) includes a first retaining wall of the first receiving recess (341) and a second retaining wall of the second receiving recess (342). The retainer (400) is constructed to retain both end corners of the first side (110) of the portable electronic device (100) such that the retainer (400) is in close contact with the first side (110) of the portable electronic device (100).

More specifically, part of the receiving plate (300) is first recessed to form the first receiving recess (341) and then, part of the first receiving recess (341) is recessed to form the second receiving recess (341) so that the rear surface of the portable electronic device (100) can be placed thereon.

In this case, the first receiving recess (341) on the one surface of the receiving plate (300) is open to a first direction, having the first width (W1) which is greater than the second width (W2). The first width (W1) corresponds to a larger size of a portable electronic device (100).

When a portable electronic device (100) is placed on the first receiving recess (341), the first retaining wall of the first receiving recess (341) becomes in close contact with the first side (110) of the portable electronic device (100) and retains both end corners of the first side (110) of the portable electronic device (100).

Thus, if a larger size of the portable electronic device (100) is retained on the one surface of the receiving plate (300) from the first direction, the guide apparatus (4000) can be used for a larger size of a portable electronic device (100) in that the portable electronic device (100) is received in the first receiving recess (341), not the second receiving recess (342).

In addition, the second receiving recess (342) formed on the first receiving recess (341) is open to the first direction. The second receiving recess (342) has the second width (W2) which corresponds to a smaller size of a portable electronic device (100).

When a portable electronic device (100) is placed on the second receiving recess (342), the second retaining wall of the second receiving recess (342) becomes in close contact with the first side (110) of the portable electronic device (100) and retains both end corners of the first side (110) of the portable electronic device (100).

Thus, if a smaller size of the portable electronic device (100) is retained on the one surface of the receiving plate (300) from the first direction, the guide apparatus (4000) can be used for a smaller size of a portable electronic device (100) in that the portable electronic device (100) is received in the second receiving recess (342).

As explained above, according to the fourth embodiment, the guide apparatus (4000) includes the double recess structure of the first and second receiving recesses (341, 342), and it can be effectively used for various sizes of portable electronic devices (100).

Except for the explanation above regarding the guide apparatus (4000) of the fourth embodiment, the fourth embodiment includes major structures which are identical or similar to those of the first, second, and third embodiments (1000, 2000, 3000), and thus, such duplicative structures of the first, second, and third embodiments are omitted.

While the invention has been shown and described with reference to different embodiments thereof, it will be appreciated by those skilled in the art that variations in form, detail, compositions and operation may be made without departing from the spirit and scope of the invention as defined by the accompanying claims. Thus, such variations should not be separately understood, and should be included in the scope of the present invention.

LIST OF REFERENCE CHARACTERS

| | |
|---|---|
| 100: portable electronic device | 110: first side |
| 120: second side | 200: protective film |
| 210: release sheet | 300: receiving plate |
| 301: step | 311: first coupling hole |
| 312: second coupling hole | 313: third coupling hole |
| 321: first plate | 322: second plate |
| 323: third plate | 331: first receiving surface |
| 332: second receiving surface | 341: first receiving recess |
| 342: second receiving recess | 400: retainer |
| 410: first retainer | 411: retaining side |
| 413: top surface | 420: second retainer |
| 431: first retaining wall | 432: second retaining wall |
| 1000, 2000, 3000, 4000: Guide apparatus for installing protective film | |

What is claimed is:

1. A guide apparatus for installing a protective film on a front surface of a portable electronic device, the guide apparatus comprising:

a receiving plate on which the portable electronic device is placed such that a rear surface of the portable electronic device is in contact with the receiving plate; and a retainer for retaining both end corners of a first side of the portable electronic device such that the retainer is in close contact with the first side of the portable electronic device placed on the receiving plate, wherein the retainer is constructed to have a plurality of retaining lengths on the receiving plate, and wherein the receiving plate comprises:

a first coupling hole;

a second coupling hole formed at a position spaced apart from the first coupling hole by a first distance (D1); and a third coupling hole formed at a position spaced apart from the first coupling hole by a second distance (D2), wherein the retainer comprises:

a first retainer formed to correspond to the shape of one end corner of the first side of the portable electronic device and coupled to the first coupling hole; and a second retainer formed to correspond to the shape of the other end corner of the first side of the portable electronic device and coupled to either the second coupling hole or the third coupling hole.

2. The guide apparatus of claim 1, wherein the protective film includes a release sheet attached to an attachment surface of the protective film wherein the attachment surface of the protective film is constructed to be attached to the front surface of the portable electronic device, wherein the release sheet is divided into a plurality of portions by a dividing line or lines which are parallel to the first side of the portable electronic device.

3. The guide apparatus of claim 1, wherein at least one of the first retainer and the second retainer includes:

a retaining side constructed to be in close contact with a second side of the portable electronic device wherein the second side of the portable electronic device is connected to the first side of the portable electronic device; and a top surface constructed to protrude toward the front surface of the portable electronic device from an upper portion of the retaining side.

4. The guide apparatus of claim 1, wherein a step is formed on the receiving plate at a portion or portions to which the first retainer, or the second retainer, or both are coupled.

5. A guide apparatus for installing a protective film on a front surface of a portable electronic device, the guide apparatus comprising:

a receiving plate on which the portable electronic device is placed such that a rear surface of the portable electronic device is in contact with the receiving plate; and a retainer for retaining both end corners of a first side of the portable electronic device such that the retainer is in close contact with the first side of the portable electronic device placed on the receiving plate, wherein the retainer is constructed to have a plurality of retaining lengths on the receiving plate, wherein the receiving plate comprises:

a first plate having a first coupling hole and a second coupling hole formed thereon to be spaced apart from each other by a first distance (D1); and a second plate having a first coupling hole and a third coupling hole formed thereon to be spaced apart from each other by a second distance (D2), wherein the retainer comprises:

a first retainer formed to correspond to the shape of one end corner of the first side of the portable electronic device; and a second retainer formed to correspond to the shape of the other end corner of the first side of the portable electronic device, wherein the guide apparatus allows the first retainer and the second retainer to be coupled to either the first plate or the second plate.

6. The guide apparatus of claim 5, wherein at least one of the first retainer and the second retainer includes:

a retaining side constructed to be in close contact with a second side of the portable electronic device wherein the second side of the portable electronic device is connected to the first side of the portable electronic device; and a top surface constructed to protrude toward the front surface of the portable electronic device from an upper portion of the retaining side.

7. The guide apparatus of claim 3, wherein a step is formed on the receiving plate at a portion or portions to which the first retainer, or the second retainer, or both are coupled.

8. The guide apparatus of claim 5, wherein the protective film includes a release sheet attached to an attachment surface of the protective film wherein the attachment surface of the protective film is constructed to be attached to the front surface of the portable electronic device, wherein the release sheet is divided into a plurality of portions by a dividing line or lines which are parallel to the first side of the portable electronic device.

9. A guide apparatus for installing a protective film on a front surface of a portable electronic device, the guide apparatus comprising:

a receiving plate on which the portable electronic device is placed such that a rear surface of the portable electronic device is in contact with the receiving plate; and a retainer for retaining both end corners of a first side of the portable electronic device such that the retainer is in close contact with the first side of the portable electronic device placed on the receiving plate, wherein the retainer is constructed to have a plurality of retaining lengths on the receiving plate, wherein the receiving plate includes a first receiving surface and a second receiving surface, wherein the first receiving surface has a first width (W1) and is formed on one surface of the receiving plate, and the second receiving surface has a second width (W2) and is formed on the other surface of the receiving plate, and wherein the retainer includes a first retaining wall and a second retaining wall, wherein the first retaining wall is formed along a perimeter of the first receiving surface except for a first direction, and the second retaining wall is formed along a perimeter of the second receiving recess except for the first direction.

10. The guide apparatus of claim 9, wherein the protective film includes a release sheet attached to an attachment surface of the protective film wherein the attachment surface of the protective film is constructed to be attached to the front surface of the portable electronic device, wherein the release sheet is divided into a plurality of portions by a dividing line or lines which are parallel to the first side of the portable electronic device.

11. A guide apparatus for installing a protective film on a front surface of a portable electronic device, the guide apparatus comprising:

a receiving plate on which the portable electronic device is placed such that a rear surface of the portable electronic device is in contact with the receiving plate; and a retainer for retaining both end corners of a first side of the portable electronic device such that the retainer is in close contact with the first side of the portable electronic device placed on the receiving plate, wherein the retainer is constructed to have a plurality of retaining lengths on the receiving plate, wherein the receiving plate includes a first receiving recess and a second receiving recess, wherein the first receiving recess has a first width (W1) and is formed on one surface of the receiving plate, and the second receiving recess has a second width (W2) and is formed on the other surface of the receiving plate, wherein the first receiving recess is open to a first direction and the second receiving recess is open to a second direction where the first direction and the second direction are opposite directions, wherein the retainer includes a first retaining wall of the first receiving recess and a second retaining wall of the second receiving recess, wherein the retainer is constructed to retain both end corners of the first side of the portable electronic device such that the retainer is in close contact with the first side of the portable electronic device.

12. The guide apparatus of claim 11, wherein the first receiving recess and the second receiving recess are formed not to overlap with each other.

13. The guide apparatus of claim 11, wherein the protective film includes a release sheet attached to an attachment surface of the protective film wherein the attachment surface of the protective film is constructed to be attached to the front surface of the portable electronic device, wherein the release sheet is divided into a plurality of portions by a dividing line or lines which are parallel to the first side of the portable electronic device.

\* \* \* \* \*